United States Patent [19]

Pellicelli

[11] Patent Number: 4,482,602
[45] Date of Patent: Nov. 13, 1984

[54] DIELECTRICALLY HEATABLE POLYOLEFIN FOAMS CONTAINING UNSATURATED POLYESTER

[75] Inventor: Bruno Pellicelli, Mapello, Italy

[73] Assignee: Bayer Aktiengesellschaft, Leverkusen, Fed. Rep. of Germany

[21] Appl. No.: 585,268

[22] Filed: Mar. 1, 1984

Related U.S. Application Data

[62] Division of Ser. No. 490,148, Apr. 29, 1983, Pat. No. 4,454,256.

[30] Foreign Application Priority Data

May 11, 1982 [IT] Italy .................................. 21191 A/82

[51] Int. Cl.³ ........................... B32B 5/22; B32B 7/04
[52] U.S. Cl. .................................. 428/245; 156/308.2; 428/246; 428/296; 428/304.4; 428/316.6

[58] Field of Search ............ 428/245, 246, 296, 304.4, 428/316.6, 319.9, 314.4, 314.8; 156/308.2

[56] References Cited

U.S. PATENT DOCUMENTS

| | | | |
|---|---|---|---|
| 4,035,537 | 7/1977 | Heckel et al. | 428/314.8 |
| 4,097,319 | 6/1978 | Shimokawa et al. | 428/319.9 |
| 4,130,948 | 12/1978 | Krug | 428/314.4 |
| 4,214,034 | 7/1980 | Kodera et al. | 428/319.9 |

FOREIGN PATENT DOCUMENTS 2088380 1/1972 France .
2325682 4/1977 France .

*Primary Examiner*—William J. Van Balen
*Attorney, Agent, or Firm*—Connolly and Hutz

[57] ABSTRACT

Dielectrically heatable polyolefin foams which contain from 3 to 20% by weight of an unsaturated polyester being optionally fully hardened.

8 Claims, No Drawings

DIELECTRICALLY HEATABLE POLYOLEFIN FOAMS CONTAINING UNSATURATED POLYESTER

This is a division of application Ser. No. 490,148 filed Apr. 29, 1983, now U.S. Pat. No. 4,454,256.

This invention relates to dielectrically weldable polyolefin foams which have been produced in the presence of unsaturated polyester resins.

It is already known that certain plastics can be high-frequency-welded by means of an electromagnetic field in which the molecules are made to oscillate and thus generate the heat required for welding in the plastic itself with very little or no need for external heating. Because of the ability to oscillate only specific plastics can be high-frequency-welded, for example, polyvinyl chloride. Polyolefins, particularly polyethylenes, cannot.

The ability, however, of the dielectric heating of polyolefins is of considerable economic interest not only because the material can be heated without damage in a few seconds, but also because the electrodes of the high-frequency field may also be used as a forming tool.

Therefore attempts have already been made to render polyolefins dielectrically heatable for instance by adding certain additives.

Thus polyethylenes inter alia have been made high-frequency-weldable by admixture with ethylene/vinyl acetate copolymers.

Such mixtures, however, are not suitable for the production of crosslinked polyolefin foams because, during the production of the foamable and crosslinkable polyolefin sheets, crosslinking can already occur in the extruder.

Although some monomeric plasticizers, such as dioctyl phthalate are known as useful additives for dielectric heating, these plasticizers are incompatible with polyolefins and, even in small quantities, interfere with the foaming reaction.

Additionally polyolefins can be made dielectrically heatable by the incorporation of various fillers, for example barium ferrite. Unfortunately, additives such as these also affect the foaming of the polyolefins so that it is not possible to produce polyolefin foams having a low density.

Another known possibility is to add chlorinated polyethylene which produces an improvement in high frequency heating. However, the improvement is not sufficient for utilization on a large scale.

Surprisingly, has been now found that it is possible to produce dielectrically heatable foams by modifying polyolefins with $\alpha,\beta$-unsaturated polyesters.

Acccordingly, the present invention relates dielectrically heatable polyolefins foams containing $\beta,\alpha$-unsaturated polyesters in a quantity of from 3 to 20% by weight and preferably in a quantity of from 5 to 10% by weight, based on the foam.

The foams according to the invention may be produced either by continuous methods and by batch methods of the type described, for example, in German Pat. No. 1,694,130 or in U.S. Pat. No. 3,711,584.

The foams according to the invention are preferably produced by mixing the polyolefins with the foaming agent, the crosslinking agent optionally other known additives and the unsaturated polyesters in the amount set forth above either on mixing rolls or in an extruder and extruding the mixture to a sheet at temperatures below the decomposition point of the foaming and crosslinking agent. The preferably continuous polyolefin sheet is then crosslinked below the decomposition point of the foaming agent by irradiation or by heating to the decomposition temperature of the crossling agent whereby crosslinking and foaming can occur simultaneously.

Usually as the temperature is further increased, the sheet foams completely. A foam having a density of from 15 kg/m$^2$ to 300 kg/m$^3$, preferably from 20 to 200 kg/m$^3$, is obtained guided by the quantities of foaming agent and crosslinking agent used.

The process is preferably used for the production of continuous foam sheets, for example by the process described in DE-AS No. 1,694,130 in which the continuous polyolefin sheet is heated in a furnace through which it passes on an endless conveyor belt.

The foaming agents used are known and are compounds which evolve gas under heating and of which the decomposition temperature should be higher than that of the crosslinking agent. Suitable foaming agents, are, for example, azodicarbonamide and/or p,p'-oxy-bis-benzene sulfonyl hydrazide and/or dinitrosopentamethylene tetramine. The preferred foaming agent is azodicarbonamide which has a decomposition point or decomposition range about 190° C. The quantity of foaming agent used depends upon the required foam density of the foam to be produced and is generally between 0.5 and 25% by weight and preferably between 1 and 20% by weight, based on the total mixture to be foamed.

The inventive foams may be crosslinked in known manner by exposure to high-energy radiation or by means of crosslinking agents such as organic peroxides, like 2,5-dimethyl-2,5-di-(tert.-butylperoxy)-hexane, tert.-butyl hydroperoxide, cumyl-tert.-butyl peroxide, ditert.-butyl peroxide. Dicumyl peroxide is preferrably used. The peroxides are used in quantities of from 0.3 to 1.5% by weight, based on the polyolefin to be foamed.

Suitable polyolefins are polyethylene or polypropylene and mixtures thereof. It is preferred to use polyethylene like polyethylene having a density of from 0.94 to 0.97 g/cc and/or polyethylene having a density of from 0.91 to 0.94 g/cc, high-pressure polyethylene being preferred. According to the invention, however, the term polyolefins also includes copolymers, preferably ethylene copolymers being built of more than 50 mol % ethylene. Copolymers of this type, are, for example, ethylene-propylene copolymers, ethylene-butylene copolymer, copolymers of ethylene and acrylic acid or derivatives thereof, copolymers of ethylene and methacrylic acid or derivatives thereof. According to this invention, mixtures of the above-mentioned polyolefins with rubbers and/or other plastics may also be added to the foamable mixture. Mixtures of this type should contain at least 50% by weight of polyolefins. Rubbers miscible with polyolefins are, for example, natural rubber, butyl rubber, polyisobutylene, ABS-rubber, polybutadiene, polybutene and polyisoprene. Thermoplastics mixable with polyolefins are, for example, polystyrene, chlorinated polyethylenes or sulfochlorinated polyethylene.

As $\alpha,\beta$-unsaturated polyesters preferably $\alpha,\beta$-unsaturated polyesters are used which are polycondensation products of at least one $\alpha,\beta$-ethylenically unsaturated dicarboxylic acid having 4 to 10 carbon-atoms or derivatives thereof, for example anhydrides, optionally in admixture with up to 200 mole percent, based on the unsaturated acid component, of at least one aliphatic or cycloaliphatic dicarboxylic acid containing from 8 to 10 carbon atoms or derivatives thereof, with at least one polyhydroxy compound, particularly a dihydroxy compound containing from 2 to 8 carbon atoms. Such polyesters are described in J. Bjorksten et al "Polyesters and their Applications", Reinhold Publishing Corp., New York, 1956.

Examples of preferred unsaturated dicarboxylic acids or their derivatives are maleic acid or maleic acid anhydride and fumaric acid. However, it is also possible to use mesaconic acid, citraconic acid, itaconic acid or chlormaleic acid. Examples of the aromatic, aliphatic saturated or cycloaliphatic dicarboxylic acids or their derivatives which may be used in accordance with this invention are phthalic acid and phthalic acid anhydride, isophthalic acid, terephthalic acid, hexa- or tetrahydrophthalic acid and their anhydrides, endomethylene tetrahydrophthalic acid and its anhydride, succinic acid and succinic acid anhydride and succinic acid esters and chlorides, adipic acid and sebacic acid. In order to obtain flame-resistant resins, it is possible for example, to use hexachloroendomethylene tetrahydrophthalic acid, tetrachlorophthalic acid or tetrabromophthalic acid. Suitable dihydric alcohols are aliphatic diols with $C_2-C_{16}$ ethylene glycol, 1,2- and 1,3-propane diol, diethylene glycol, dipropylene glycol, 1,3- and 1,4-butane diol, neopentyl glycol, 1,6-hexane diol, 2,2-bis-(4-hydroxycyclohexyl)-propane perhydrobisphenol or phenols like bisalkoxylated bisphenol A. Ethylene glycol, 1,2-propane diol, diethylene glycol and dipropylene glycol are preferred.

Further modifications of the polyesters are possible through the incorporation of mono-, tri- and tetrahydric alcohols containing from 1 to 6 carbon atoms, such as methanol, ethanol, butanol, allyl alcohol, benzyl alcohol, cyclohexanol and tetrahydrofurfuryl alcohol, trimethyl propane, glycerol and pentaerythritol, mono-, di- and triallyl ethers and benzyl ethers of trihydric and higher alcohols containing from 3 to 6 carbon atoms according to DE-AS No. 10 24 654, for example trimethylol propane diallyl ether, and through the incorporation of monobasic acids, such as benzoic acid and acrylic acid.

The polyesters should have an acid number of between 10 and 100 and preferably between 20 and 70 and an OH-number of between 10 and 150 and preferably between 20 and 100. Their molecular weights, determined as number averages $\overline{M}_n$, should be in the range from about 500 to 5000 and preferably in the range from about 1000 to 3000 (as measured by vapour pressure osmometry in dioxane and acetone).

Suitable unsaturated monomers copolymerisable with the unsaturated dicarboxylic acids and polyols are compounds preferably containing α-substituted vinyl or vinylidene groups or α,β-substituted allyl groups of the type commonly used for the production of polyesters, preferably styrene, chlorinated or $C_1-C_4$- alkylated or -alkenylated styrenes, for example vinyl toluene, divinyl benzene, α-methyl styrene, tert.-butyl styrene, chlorostyrenes; vinyl esters of carboxylic acids containing from 2 to 6 carbon atoms, preferably vinyl acetate, vinyl propionate, vinyl benzoate, vinyl pyridine, vinyl naphthalene, vinyl cyclohexane, acrylic acid and methacrylic acid and/or esters thereof (preferably vinyl, allyl and methallyl esters) containing from 1 to 4 carbon atoms in the alcohol component, their amides and nitriles, maleic acid anhydride, -semi- and -diesters containing from 1 to 4 anhydrides, -semi- and -diesters containing from 1 to 4 carbon atoms in the alcohol component, -semi- and -diamides or cyclic imides, such as butyl acrylate, methyl methacrylate acrylonitrile, N-methyl maleic imide or N-cyclohexylmaleic imide; allyl compounds such as allyl benzene, and allyl esters, such as allyl acetate, phthalic acid diallyl ester, isophthalic acid diallyl ester, fumaric acid diallyl ester, allyl carbonates, diallyl carbonates, triallyl phosphate and triallyl cyanurate.

In the case of crosslinking the polyolefin foam with peroxides the addition of the unsaturated polyesters enables the quantity of the peroxides to be considerably reduced.

The usual additives for polyolefine-thermoplastics, for example light stabilisers, pigments, fillers, flameproofing agents, antistatic agents, lubricants, may also be added to the mixture to be crosslinked and foamed before processing it into a sheet.

The polyolefin foams according to the invention are dielectrically heatable. Thus they can be further processed by methods known per se using dielectric heating, for example high-frequency welding-forming-stamping-at frequencies of the order of 27 mHz. In this way polyolefin foams can be easily covered with heat sensitive materials like textiles.

EXAMPLE 1

A mixture of the following products in the indicated parts by weight is extruded in an extruder to form a sheet:

| | |
|---|---|
| high pressure polyethylene | 50 parts by weight |
| chlorinated polyethylene | 30 parts by weight |
| unsaturated polyester | 5 parts by weight |
| azodicarbonamide | 14.7 parts by weight |
| dicumyl peroxide | 0.3 parts by weight. |

The standard commercial polyester was produced by polycondensation of maleic acid anhydride, ethylene, ethylene glycol, dipropylene glycol and benzyl alcohol.

The extrusion temperature of the moulding composition is about 130° C. so that neither foaming nor crosslinking occurs.

The sheet thus obtained is heated in a hot-air furnace, as described in German Patent Specification No. 1,694,130, to a temperature of about 210° C., whereby a uniformly crosslinked foam sheet is formed.

The foam sheet is cooled by means of fresh air and contact with cooled rollers. The foam has a smooth surface and a bulk density of 35 kg/m³.

By subsequent processing on a standard commercial high frequency welding machine with a frequency of 27.12 mHz and an operating pressure of 5/7 bars it is possible to obtain perfect welding of the foam thus produced to itself and to various textile fabrics.

EXAMPLE 2

As described in Example 1, by reducing the quantity of foaming agent a polyethylene foam sheet with a thickness of 3 mm and a density of 200 kg/m³ is produced. A film consisting of an ethylene vinyl acetate copolymer and having a thickness of 50 micron is placed between two sheets of foam and the sheets are high frequency welded in a high frequency apparatus in 4" at a power of 5 KW. The sheets adhere to one another without difficulty and are practically no longer able to be identified as being separate sheets.

I claim:

1. A laminate article comprising a textile layer and a foam layer wherein the foam is a dielectrically heatable, polyolefin foamed mouldings consisting essentially of from 3 to 20% by weight, based on the foam, of an unsaturated polyester obtained by a proces which comprises mixing polyolefin and 3 to 20% by weight, based on the foam to be formed, of an unsaturated polyester with a foaming agent and a crosslinking agent, extruding the mixture to a moulding, and then crosslinking and foaming the moulding by heating the moulding.

2. The laminate article according to claim 1 wherein the foam layer contains 5 to 20% by weight of an unsaturated polyester.

3. The laminate article according to claim 2 wherein the polyester is fully hardened.

4. The laminate article according to claim 1 wherein the polyolefin foam is crosslinked.

5. The laminate article according to claim 1 wherein the polyolefin of the foam is polyethylene or a mixture of polyethylene with up to 30% by weight of chlorinated polyethylene.

6. The laminate article according to claim 1 wherein the foam layer and the textile layer are bonded in sheet form.

7. A process for producing the laminate article according to claim 7 where a layer of the foam and a textile layer are contacted and bonded by applying pressure and heat.

8. The process according to claim 7 where the heat is applied by dielectric heating.

* * * * *